United States Patent [19]
Kashyap et al.

[11] Patent Number: 5,873,074
[45] Date of Patent: Feb. 16, 1999

[54] APPLYING DISTINCT HASH-JOIN DISTRIBUTIONS OF OPERATORS TO BOTH EVEN AND UNEVEN DATABASE RECORDS

[75] Inventors: Anurag Kashyap, Fremont, Calif.; Robert H. Gerber; Diane L. Davison, both of Portland, Oreg.; Sanket Atal, Aloha, Oreg.; Hannes A. Spintzik; Mark T. Nelson, both of Portland, Oreg.

[73] Assignee: Informix Software, Inc., Menlo Park, Calif.

[21] Appl. No.: 844,259

[22] Filed: Apr. 18, 1997

[51] Int. Cl.[6] .................................................. G06F 17/30
[52] U.S. Cl. .......................... 707/2; 707/1; 707/3; 707/4; 707/6; 707/8
[58] Field of Search .................................. 707/2, 3, 4, 6, 707/1, 8

[56] References Cited

U.S. PATENT DOCUMENTS

| | | | |
|---|---|---|---|
| 5,121,494 | 6/1992 | Dias et al. .................................... | 707/2 |
| 5,163,131 | 11/1992 | Row et al. .......................... | 395/200.32 |
| 5,355,453 | 10/1994 | Row et al. .......................... | 395/200.32 |
| 5,414,704 | 5/1995 | Spinney ........................................ | 707/1 |
| 5,551,031 | 8/1996 | Cheng et al. ............................... | 707/2 |
| 5,557,791 | 9/1996 | Cheng et al. ............................... | 707/2 |
| 5,687,361 | 11/1997 | Sarkar ......................................... | 707/1 |
| 5,692,177 | 11/1997 | Miller ......................................... | 707/8 |

OTHER PUBLICATIONS

Li–Yan Yuan, "VLDB '92", Proceedings of the 18th International Conference on Very Large Data Bases, Aug. 23–27, 1992, Vancouver, Canada.

Primary Examiner—Wayne Amsbury
Assistant Examiner—Shahid Alam
Attorney, Agent, or Firm—Fish & Richardson P.C.

[57] ABSTRACT

A computer-based method and system of processing records read respectively from first and second related tables of a database includes determining whether data contained in the records read from the first or second tables is unevenly distributed. Records corresponding to evenly distributed data are searched for matches using a first set of instances of the hash-join operator, and records corresponding to data which is unevenly distributed are searched for matches using a second set of instances of a hash-join operator.

41 Claims, 7 Drawing Sheets

| TYPE OF SKEW → TYPE OF RECORD → | RECORDS FROM BUILD-TABLE (FIRST TABLE) | RECORDS FROM PROBE-TABLE (SECOND TABLE) |
|---|---|---|
| BUILD-SKEW (LOCAL OR GLOBAL) | DISTRIBUTE SUBSTANTIALLY EVENLY AMONG SECOND-LEVEL INSTANCES OF HASH-JOIN OPERATOR | REPLICATE AND ROUTE COPY TO EACH SECOND-LEVEL INSTANCE OF HASH-JOIN OPERATOR |
| PROBE-SKEW (LOCAL OR GLOBAL) | REPLICATE AND ROUTE COPY TO EACH SECOND-LEVEL INSTANCE OF HASH-JOIN OPERATOR | DISTRIBUTE SUBSTANTIALLY EVENLY AMONG SECOND-LEVEL INSTANCES OF HASH-JOIN OPERATOR |
| JOIN SKEW | REPLICATE AND ROUTE COPY TO EACH SECOND-LEVEL INSTANCE OF HASH-JOIN OPERATOR | DISTRIBUTE SUBSTANTIALLY EVENLY AMONG SECOND-LEVEL INSTANCES OF HASH-JOIN OPERATOR |

FIG. 5

APPLYING DISTINCT HASH-JOIN DISTRIBUTIONS OF OPERATORS TO BOTH EVEN AND UNEVEN DATABASE RECORDS

BACKGROUND OF THE INVENTION

This invention relates generally to processing records from a database.

A database is a body of information that is logically organized so that the information can be retrieved, stored and searched by a computer system in a coherent manner by a "database engine"—a collection of methods for retrieving or manipulating data in the database. Databases generally fall into one of several categories, such as relational databases, object-oriented databases and object-relational databases.

A relational database (RDB) is a collection of fixed-field two-dimensional tables that can be related or "joined" to each other in virtually any manner a database developer chooses. The structure of a relational database can be modified by selectively redefining the relationships between the tables. A database engine may perform complex searches on a relational database quickly and easily with a protocol known as the Structured Query Language (SQL). The relationships between the tables enable results of a search automatically to be cross-referenced to corresponding information in other tables in the database. As shown in FIG. 1, for example, a relational database 1 includes a customer table 2 which is joined by a logical link 3 to an order table 4 which in turn is joined by a logical link 5 to an inventory table 6. A user may query the database 1, for example, for all order numbers higher than a threshold value. The list of order numbers resulting from the query can be retrieved and displayed along with the respective customer names and inventory items that correspond to the identified order and numbers because the order table 4 is joined with the customer table 2 and the inventory table 6. As illustrated by this example, a "join" operation builds a relation from two or more specified tables consisting of all possible combinations of tuples, one from each of the two or more tables, such that the tuples contributing to any given combination satisfy some specified condition. Generally, a join operation is performed in response to a query in which data is to be retrieved from more than one table in a database.

Hash operations can be used to simplify and provide fast access to a specific stored record on the basis of a given value for some field in the database. More specifically, a "hash-join" operation can be used to provide a quicker response to a query requiring data retrieval from multiple tables in the database. Consider, for example, a join operation involving two tables, "build" and "probe". Data entries or records from the "build" table, for example, are used to construct a hash table in a computer memory using a hash-function. A hash-function is similarly applied to the appropriate records in the "probe" table. The hashed values from the "probe" table are then used to search for matches in the hash table constructed from the "build" table. When a match is found, the data from the "probe" table is joined with the corresponding data from the "build" table. The matched data is returned to the user as a result of the "hash-join" operation.

In the context of parallel processing, various operations executed during a hash-join operation can be performed in parallel by executing multiple instances of the various operations simultaneously on one or more processors. For example, the operator, or software module, producing the data for the "build" side, the operator producing the data for the "probe" side, and the hash-join operator can be performed in parallel.

Ideally, each bucket in the hash table of each instance of the hash-join operator receives approximately the same amount of data. However, this ideal distribution may not occur because the distribution of data values in the "build" and "probe" tables is skewed, or unevenly distributed. For example, if all the entries in a particular column of the table "build" are identical, then all the records from the build-table will be sent to the same instance of the hash-join operator, leaving the remaining instances of the hash-join operator idle, and resulting in a waste of available processing power.

Several types of skewing of data can be identified: (1) "build" skew; (2) "probe" skew; and (3) "join" skew. Build skew indicates that the data used to construct the hash table is unevenly distributed, or, in other words, that the data from the build table is unevenly distributed. Probe skew indicates that the data from the probe table is unevenly distributed. Finally, join skew indicates that the output data produced by the hash-join operation is unevenly distributed. Join skew can occur even if the input data from the build and probe tables is evenly distributed.

SUMMARY OF THE INVENTION

In general, in one aspect, the invention features a computer-based method of processing records read respectively from first and second related tables of a database. The method includes determining whether data contained in the records read from at least one of the first and second tables is unevenly distributed. Matches among records corresponding to evenly distributed data are searched using a first set of instances of the hash-join operator, and matches among records corresponding to data which is unevenly distributed are searched using a second set of instances of a hash-join operator.

Various implementations of the invention include one or more of the following features. Each of the instances in the first set and second set of instances of the hash-join operator can include a respective hash table which includes multiple buckets. Each record read from the first table or the second table can be mapped to one of the buckets in one of the hash tables in the first set of instances of the hash-join operator. Also, each record read from the first table or the second table can be routed to at least one of the buckets in the first set or the second set of instances of the hash-join operator.

Several forms of global skew can be detected, for example, by checking whether any of the instances in the first set of instances of the hash-join operator is receiving more than a predetermined share of the records read from the first or second tables. If it is determined that a particular instance in the first set of instances of the hash-join operator is receiving more than the predetermined share of the records read from the first or second tables, then one of the buckets in the particular instance of the hash-join operator is labelled as a spilled bucket.

Similarly, several forms of local skew can be detected by checking whether any of the buckets in one of the instances in the first set of instances of the hash-join operator is receiving more than a predetermined share of the records read from the first or second table relative to other buckets in the same instance of the first set of instances of the hash-join operator. If it is determined that a particular instance of the hash-join operator is receiving more than the predetermined share of the records read from the first or second table, then one of the buckets in the particular instance of the hash-join operator is labelled as a spilled bucket.

In addition, another form of global skew, join-skew, can be detected by checking whether any of the instances in the first set of instances of the hash-join operator is producing more than a predetermined share of matching records read from the first and second tables. If it is determined that a particular instance of the hash-join operator is producing more than the predetermined share of matching records read from the first or second tables, then one of the buckets in the particular instance of the hash-join operator is labelled as a spilled bucket.

Thus, according to another aspect, the invention features a computer-based method of processing records read respectively from first and second related tables of a database including searching for matching records among the records read from the first and second tables using a first set of instances of a hash-join operator. Each instance of the first set of instances of the hash-join operator includes a respective hash table comprising multiple buckets. The method further includes determining whether any of the instances in the first set of instances of the hash-join operator is producing a relatively uneven number of matching records. If it is determined that the particular instance of the hash-join operator is producing a relatively uneven number of the matching records, then one of the buckets in a particular instance in the first set of instances of the hash-join operator is labelled as a spilled bucket. The method also includes continuing to search for matches among records mapped to a non-spilled bucket using the first set of instances of the hash-join operator, and searching for matches among records mapped to the spilled bucket using a second set of instances of a hash-join operator.

In a further aspect, the invention features a programmable computer system including at least one processor, a data storage system, at least one input device, and at least one output device. The data storage system includes a database including a first table and a second table related to the first table. The processor is programmed to respond to a query received through the input device by performing various of the operations described above. In addition, the invention features a computer program, residing on a computer readable medium, for performing the operations described above.

Different forms of data skew can be checked for and detected independently of one another. Thus, in various implementations, only certain forms of skew may be searched for or detected. In other implementations, multiple forms of skew can be searched for, detected and handled in the manner described above and discussed in greater detail below.

In general, records from the first or second table that have been previously routed to a spilled bucket or that are subsequently mapped or routed to a spilled bucket are re-routed to at least one of the instances in the second set of instances of the hash-join operator in a manner that ensures that matches between records from the first and second tables will be found. Thus, depending on the particular type of skew detected, records read from the first table that are mapped or routed to a spilled bucket are re-routed to the second set of instances of the hash-join operator either by distributing them evenly among the second set of instances of the hash-join operator, such as in a round-robin technique, or by replicating each such record and sending a copy of the replicated record to each of the second set of instances of the hash-join operator. Records read from the second table that are mapped to a particular spilled bucket are re-routed to the second set of instances of the hash-join operator in the inverse manner used to re-route the records from the first table that were mapped or routed to the same spilled bucket. Thus, with respect to a particular spilled bucket, if the records from the first table were re-routed to the second set of instances of the hash-join operator using, for example, a round-robin technique, then the records from the second table that are mapped to the same spilled bucket will be routed to the second set of instances of the hash-join operator using the replication technique. Conversely, with respect to a particular spilled bucket, if the records from the first table were re-routed to the second set of instances of the hash-join operator using the replication technique, then the records from the second table that are mapped to the same spilled bucket are routed to the second set of instances of the hash-join operator using a technique to evenly distribute the records among the second set of instances. A round-robin technique is suitable for this purpose.

The matching records can be displayed on a display screen, printed by a printer or stored in a computer data file for subsequent retrieval or further processing.

In various implementations, the invention provides one or more of the following advantages. The invention can alleviate multiple types of skew that can arise during execution of a hash-join operation, including uneven distribution of data in either one or both of two tables from which data must be joined. Thus, skewing of data that results from identical or similar records in a database can be alleviated. The invention can also alleviate forms of skew of non-duplicate data values that often arise in parallel processing systems. The invention thus provides a versatile technique for dealing with multiple forms of skew, thereby allowing the speed and efficiency of data retrieval systems to be enhanced.

Additional features and advantages will be apparent from the following detailed description and claims, as well as the accompanying drawings.

BRIEF DESCRIPTION OF THE DRAWINGS

FIG. 5 is a chart listing how various types of data skew are handled according to one implementation of the invention.

DESCRIPTION OF THE PREFERRED EMBODIMENTS

Figure 1:
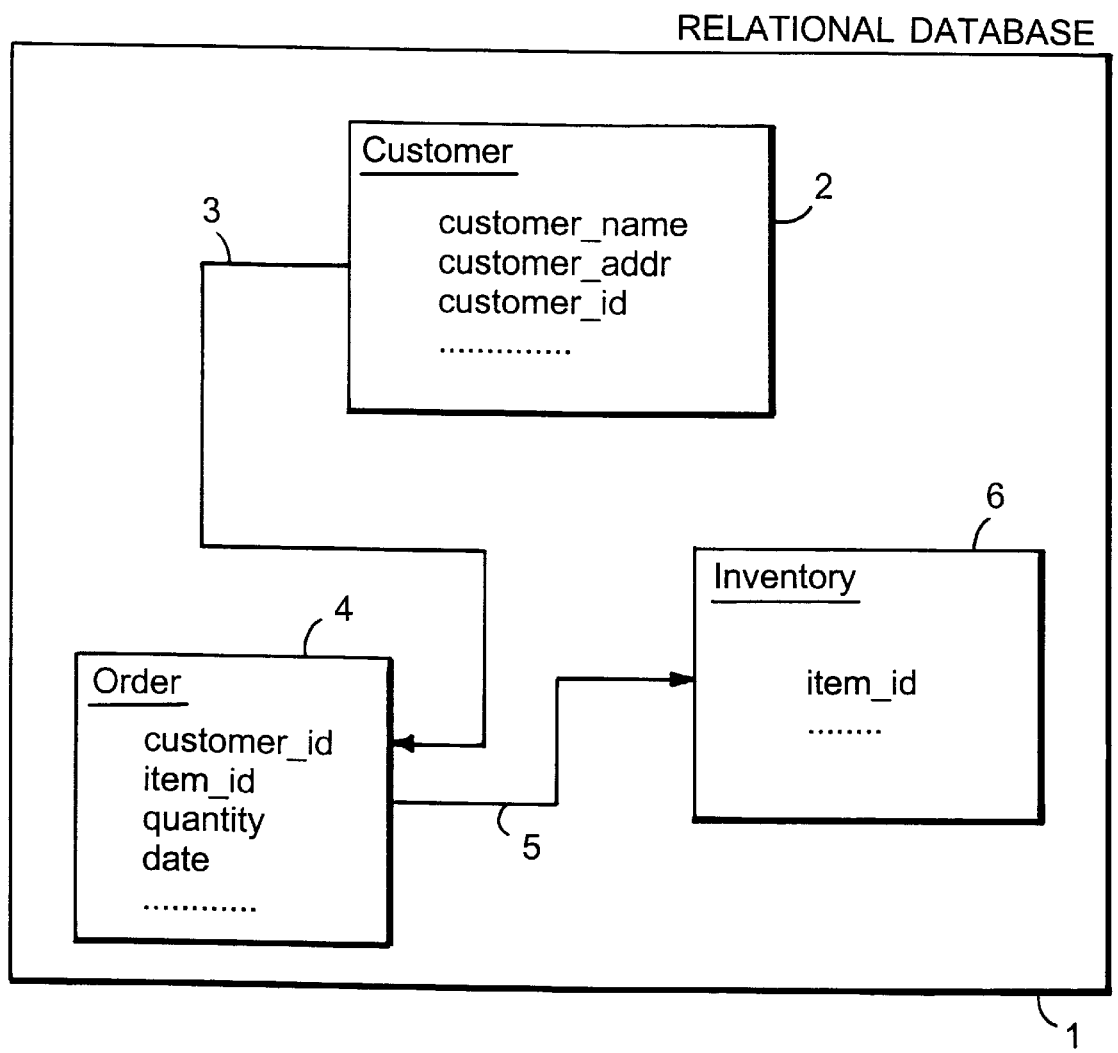
FIG. 1 is a diagram of a relational database.
Figure 1A:
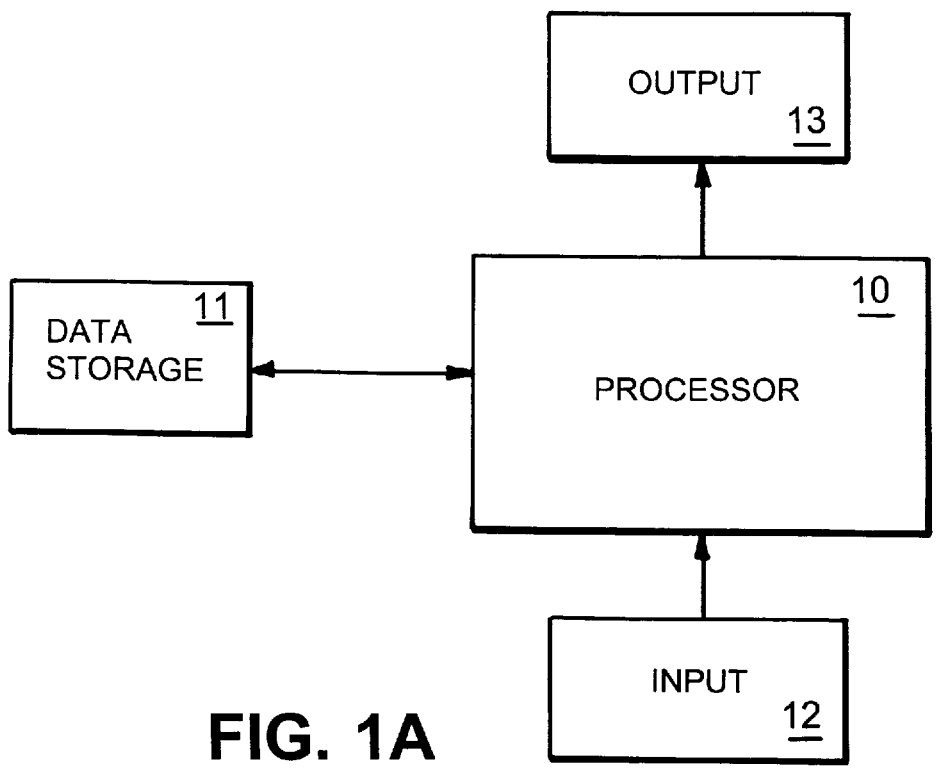
FIG. 1A is a block diagram of programmable computer system in which the method of the invention can be executed.

The invention, which is discussed in greater detail below, can be implemented in hardware or software, or a combination of both. For example, as shown in FIG. 1A, the invention can be implemented in computer programs executing on programmable computers each of which includes at least one processor 10, a data storage system 11, at least one input device 12, and at least one output device 13. The data storage system 11 includes a relational database, which can be similar to the database 1 shown in FIG. 1 and discussed above. Program code is applied to enter data to perform the functions described below and to generate output information in response to a query from a user of the system. A user enters a query into the system through the input device 12, for example, a keyboard connected to the processor 10. Results of a query can be displayed on the output device 13, which in some implementations can be a display screen attached to the processor. Alternatively, the results can be printed out on a printer attached to the computer or they can be stored in a data file in the computer system for subsequent retrieval or further processing.

Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described below.

The program can be executed by a computer system, such as a cluster or a massively parallel system, which has a switch allowing multiple nodes to be connected, wherein each node includes a processor, memory and a disc.

Figure 2:
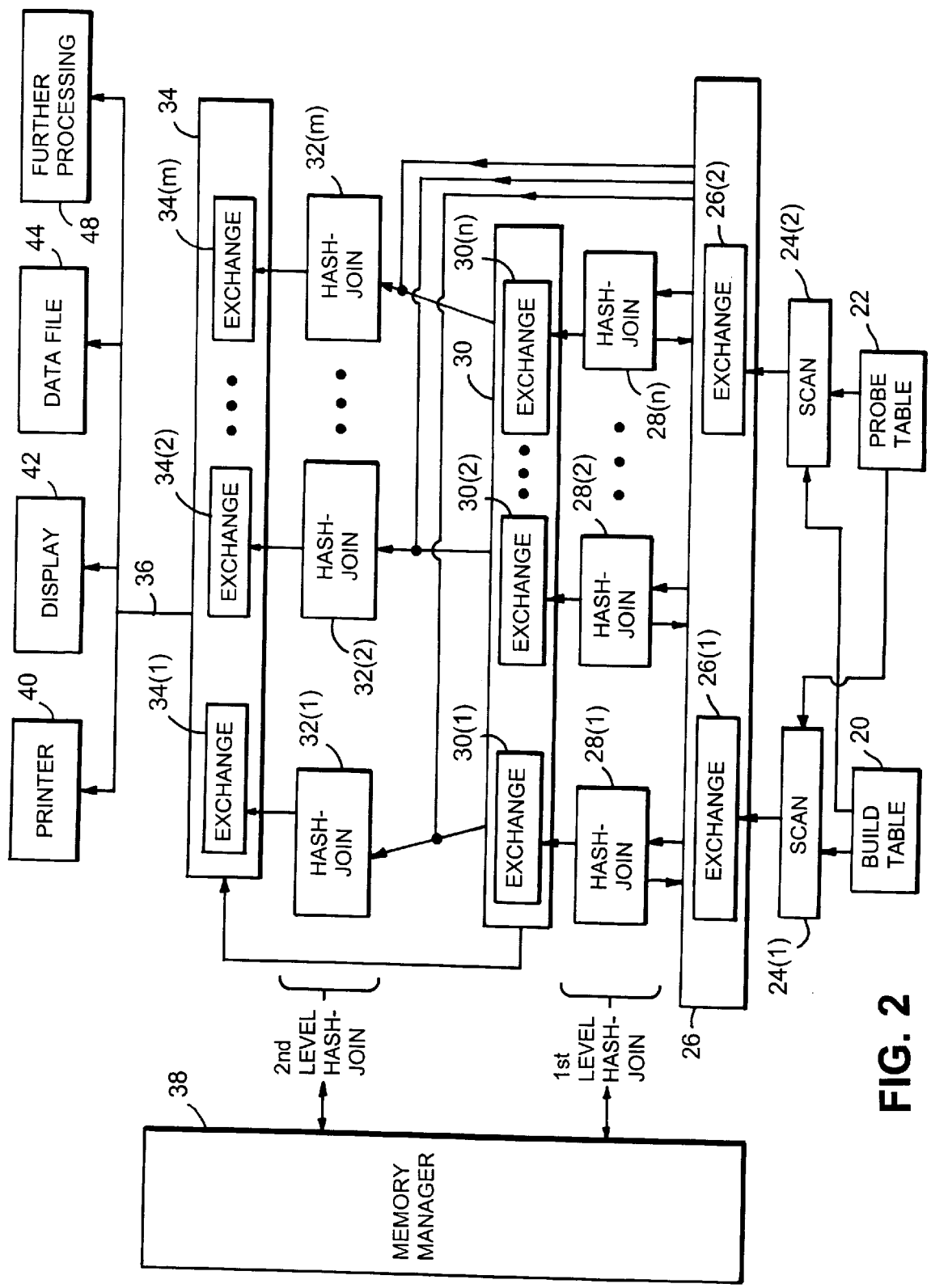
FIG. 2 is a partial block diagram of a system for performing a hash-join operation according to the invention.

A hash-join operation is performed in response to a query entered through the input device into the computer system containing the database 1. FIG. 2 illustrates a suitable structure for performing a hash-join operation according to the invention. A database, such as the database 1 (see FIG. 1), includes a first table (the "build-table") 20 and a second table (the "probe-table") 22. The build-table 20 and the probe-table 22 are two-dimensional tables in which records are identified by a row and column. The two tables 20, 22 are related to one another or, in other words, are joined by a logical link, such as the logical link 3 or 5. Multiple instances of a scan operator 24(1), 24(2) are provided to read records from the build-table and the probe-table. Although only two instances of the scan operator 24 are shown in FIG. 2, on general, one or more instances of the scan operator can be utilized. Also, in some implementations, a different scan operator is used to read records from the probe-table than the scan operator used to read records from the build-table. Records that are read from either the build-table or the probe-table are passed to a corresponding one of multiple instances of an exchange 26(1), 26(2) where they are routed either to a first level of instances of a hash-join operator, 28(1) through 28(n), or to a second level of instances of the hash-join operator, 32(1) through 32(m). The number of instances of the hash-join operator at the second level can be less than, equal to or greater than the number of instances of the hash-join operator at the first level. The first-level instances of the hash-join operator 28 can send control messages, via a scheduler (not shown) to the various instances of the exchange 26. Control messages can also be sent by the instances of the exchange 26 to the first-level instances of the hash-join operator 28. In addition, records that are output from the first-level instances of the hash-join operator 28 are routed by a corresponding instance of another exchange, 30(1) through 30(n), either to the second level of instances of the hash-join operator, 32(1) through 34(m), or to yet a corresponding instance of another exchange 34, as explained in greater detail below.

In general, the system of FIG. 2 is programmed to search, in response to a query from a user, for matches between records in the probe-table 22 and records in the build-table 20 using the first and second-level instances of the hash-join operator 28, 32. To improve the efficiency of the system, various forms of unevenly distributed data are detected during the processing of the records from the build and probe tables. Searches for matches among evenly distributed data is performed by the first-level instances of the hash-join operator 28, and searches for matches among data which is unevenly distributed, or skewed, is performed by the second level of instances of the hash-join operator 32. All matches found between build-records and probe-records are provided as output from the various instances of the exchange 34 on line 36. The matching records can be displayed on a display screen, printed by a printer or stored in a computer data file for subsequent retrieval. Alternatively, the matching records can be processed further, for example, by a sorting operation or another hash-join operation.

Figure 3:
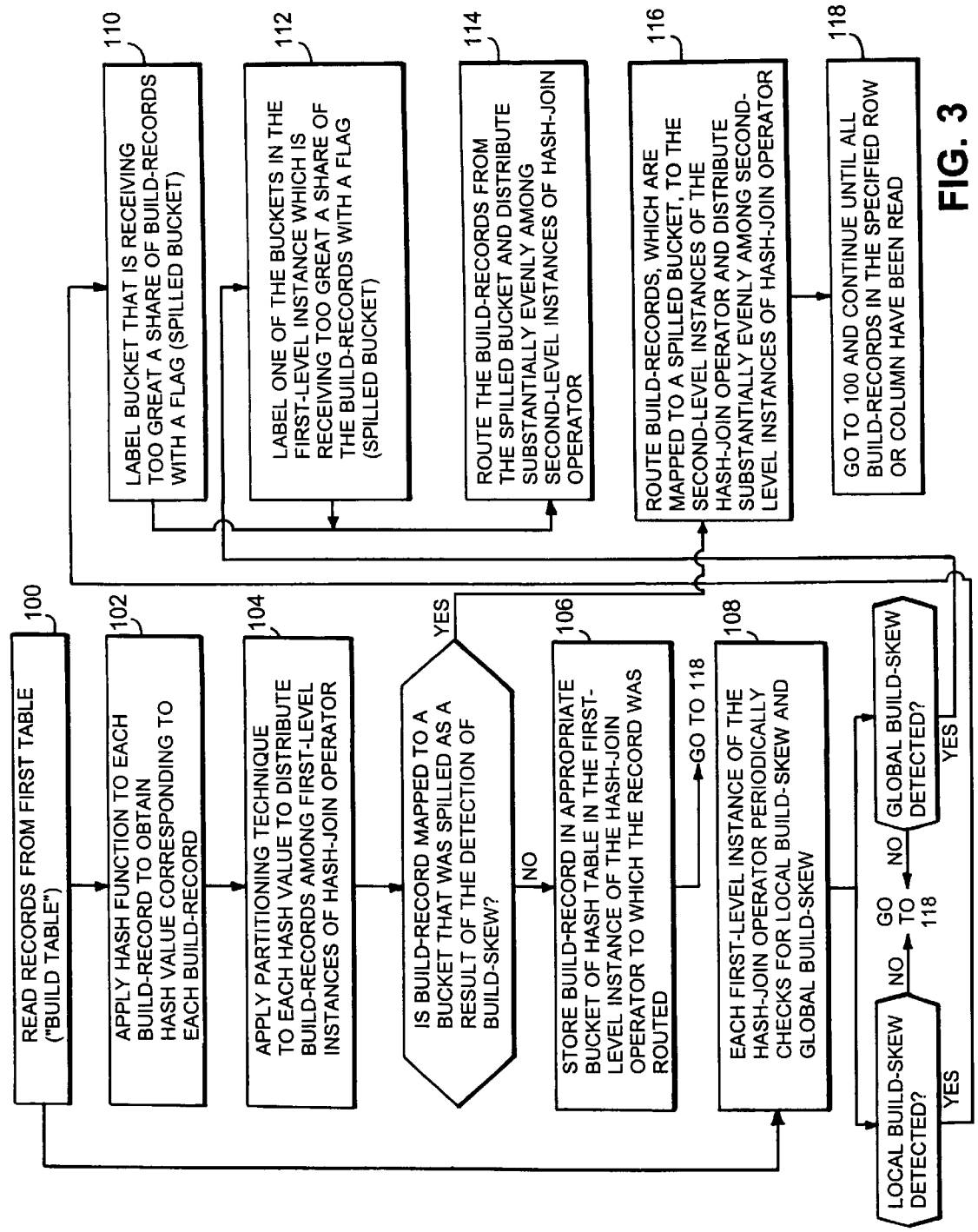
FIGS. 3, 4A and 4B are flow charts of a method of performing a hash-join operation according to the invention.

FIG. 3 illustrates the initial processing of the records from the build-table 20. As indicated by 100, the records from the build-table 20 are read by the instances of the scan operator 24(1), 24(2) which pass the build-records to the corresponding instance of the exchange 26. For example, the instance of the scan operator 24(1) passes records to the exchange instance 26(1). Each instance of the exchange 26 applies a hash function to each build-record it receives to associate a hash value with that record, as indicated by 102. A partitioning technique is then applied, as indicated by 104, to each hash value obtained in 102 to distribute the records retrieved from the build-table 20 among the first-level instances of the hash-join operator 28.

In one implementation, for example, the partitioning technique applies a MOD operator to each hashed value. The MOD operator used in the partitioning technique divides each hash value by the number of first-level instances of the hash-join operator, in other words, the value of n, and provides the result of the MOD function as its output. The build-record which corresponds to the calculated hash value is routed by the appropriate instance of the exchange 26 to a particular one of the first-level instances of the hash-join operator, 28(1) through 28(n), based on the result of the MOD function. Each record from the build-table is then stored in a bucket of a hash table in the particular instance of the hash-join operator to which the record is routed, as indicated by 106.

According to one implementation, the hash table residing in each instance of the hash-join operator, 28(1) through 28(n), 32(1) through 32(m), is a two-dimensional table comprising, for example, one hundred and ninety-nine partitions each of which has 1009 slots. A bucket in the hash table of a particular instance of the hash-join operator is identified by specifying its partition and slot. Each bucket in the hash tables, which can be implemented, for example, using random access memory (RAM), corresponds to one or more particular hash values. Each build-record that is routed to a particular instance of the hash-join operator is assigned to a-bucket in that instance's hash table based on the hash value associated with that record. For example, a MOD operator can be used to divide each hash value by the number of partitions in the hash table and also to divide each hash value by the number of slots in the hash table. The results of the MOD functions can be used to assign each record to a particular bucket in the hash table. A particular bucket in the hash table can store one or more build-records. In certain situations, some buckets may contain no records.

As the records from the build-table 20 are routed to the hash tables residing in each first-level instance of the hash-join operator 28, a determination is made periodically as to whether the data from the build-table is skewed or unevenly distributed, as indicated by 108. Each first-level instance of the hash-join operator, 28(1) through 28(n), checks for two forms of build-skew, local build-skew and global build-skew.

Specifically, each first-level instance of the hash-join operator 28 periodically determines whether any bucket in its hash table has received more than a predetermined number or percentage of the records from the build-table with respect to the other buckets in its hash table. If a particular bucket is receiving more than the predetermined number or percentage of records, then the particular bucket is assumed to be receiving too great a share of the records from the build-table, and the data in the build-table is assumed to be unevenly distributed. This form of build-skew is referred to as local build-skew. In one implementation, the particular bucket that is receiving too great a share of the build-records is labelled with a flag indicating that the build-records subsequently mapped to the particular bucket are to be re-routed to the second-level instances of the hash-join operator 32, as indicated by 110. The detection of this form of build-skew is made by examining buckets in each first-level instance of the hash-join operator 28 independently of other instances of the hash-join operator. As additional records are read from the build-table 20, other buckets in the hash table of the same or a different instance of the hash-join operator, 28(1) through 28(n), can be found to be receiving too great a share of the records from the build-table. Any such additional buckets are also labelled with a flag indicating that build-records which are subsequently-mapped to those buckets are to be re-routed to the second-level instances of the hash-join operator 32. Further details are discussed below regarding the detection of this form of build-skew.

Each first-level instance of the hash-join operator, 28(1) through 28(n), also periodically determines whether it is receiving more than a predetermined number or percentage of the records from the build-table with respect to the other first-level instances of the hash-join operator. If a particular instance of the hash-join operator 28 is receiving more than the predetermined number or percentage of records, then the particular instance is assumed to be receiving too great a share of the records from the build-table, and the data in the build-table is assumed to be unevenly distributed. This form of build-skew is referred to as global build-skew. In one implementation, as indicated by 112, one of the buckets in the first-level instance of the hash-join operator that is receiving too great a share of the build-records is labelled with a flag indicating that subsequently-read build-records that are mapped to the particular bucket are to be routed to the second-level instances of the hash-join operator 32. Thus, for example, the bucket which currently has the greatest number of records among the buckets in the particular instance of the hash-join operator that is receiving too great a share of the build-records is labelled with a flag to indicate that build-skew has occurred. Further details regarding the detection of global build-skew and the determination of which bucket has the greatest number of build-records at any given time are discussed below.

Each bucket whose records are designated to be re-routed to the second level of instances of the hash-join operator 32 is referred to as a "spilled" bucket. One or more buckets in the hash table of a particular first-level instance of the hash-join operator, or in some cases no buckets, may be spilled during the execution of a particular hash-join operation.

Each build-record, which is to be passed by a first-level instance of the hash-join operator 28 to the second level of instances of the hash-join operator 32 due to build-skew, has a flag associated with it. This flag indicates that the build-record was associated with a bucket that was spilled due to build-skew (either local or global build-skew). The corresponding instance of the exchange 30 recognizes the flag and routes the build-record to the appropriate second-level instances of the hash-join operator 32 in a manner which allows the records corresponding to the spilled bucket to be distributed substantially evenly among the second level of instances of the hash-join operator, 32(1) through 32(m), as indicated by 114. A round-robin technique, for example, can be used. Thus, the first build-record that is routed to the second-level instances of the hash-join operator 32 as a result of the detection of build-skew would be routed to the second-level instance 32(1). The next such build-record would be routed to the second-level instance 32(2), and so on.

As indicated by 116, records that are subsequently read from the build-table 20 and that have a hash value that corresponds to the spilled bucket are also re-routed to the second-level instances of the hash-join operator 32. These subsequently-read build-records are also distributed substantially evenly among the second-level instances of the hash-join operator, for example, using a round-robin technique. Thus, in one implementation, the first-level instances of the hash-join operator 28 simply function as a relay for build-records which are mapped to a spilled bucket by passing the build-records to the second-level instances of the hash-join operator 32. Build-records which are mapped to a bucket which is not spilled are not routed at this time to the second-level instances of the hash-join operator 32. Rather, such records continue to be routed to the appropriate bucket in one of the first-level instances of the hash-join operator 28.

To further optimize efficiency, subsequently-read records from the build-table that are mapped to a spilled bucket can be routed directly to the second-level instances of the hash-join operator 32, thereby bypassing the first-level instance of the hash-join operator 28 which includes the spilled bucket. One implementation involves the use of control messages generated by the first-level instances of the hash-join operator 28 and sent to each instance of the exchange 26. Each such control message includes an identification of the first-level instance of the hash-join operator, 28(1) through 28(n), that is processing the spilled bucket, an identification of the spilled bucket (for example, by slot and partition), and a flag indicating the type of skew (in this case, build-skew). Based on this information, each instance of the exchange 26 maintains a table in memory which allows it to keep track of whether a particular bucket is spilled or not. If, based on the corresponding hash value, a particular build-record is mapped to a bucket that was labelled as a spilled bucket due to build-skew, then the record is routed by the appropriate instance of the exchange 26 directly to the second-level instances of the hash-join operator 32 in a manner which allows the records corresponding to the spilled bucket to be distributed substantially evenly among the second-level instances of the hash-join operator 32. As indicated above, a round-robin technique is suitable for this purpose. When an instance of the exchange 26 routes a build-record to the second-level instances of the hash-join operator, 32(1) through 32(m), a flag indicating that the build-record was mapped to a bucket that was spilled as a result of build-skew is also sent. To minimize the amount of subsequent computation required, the appropriate instance of the exchange 26 can also send the corresponding hash value and previously computed partition and slot values to the second-level instances of the hash-join operator.

During the time interval immediately following the detection of build-skew, but before the appropriate control message is received and processed by the various instances of the exchange 26, it is possible that one of the instances of the exchange 26 will continue to route build-records to the spilled bucket. Should this situation occur, the first-level instance of the hash-join operator 28 that includes the spilled bucket functions as a relay with respect to any build-records which it receives and which are mapped to the spilled bucket. In this manner, all build-records which would otherwise be stored in the spilled bucket are re-routed either directly or through the first-level instances of the hash-join operator 28 to the second-level instances of the hash-join operator 32 for further processing. As previously noted, build-records that are re-routed to the second-level instances of the hash-join operator 32 as a result of the detection of build-skew (local or global) are distributed substantially evenly among the second level of instances of the hash-join operator 32, for example, using a round-robin technique.

The processing of all build-records continues in the manner described above until all the build-records in the build-table 20 have been read and stored in an appropriate bucket of a hash table in one of the first or second-level instances of the hash-join operator, as indicated by 118.

Figure 4A:
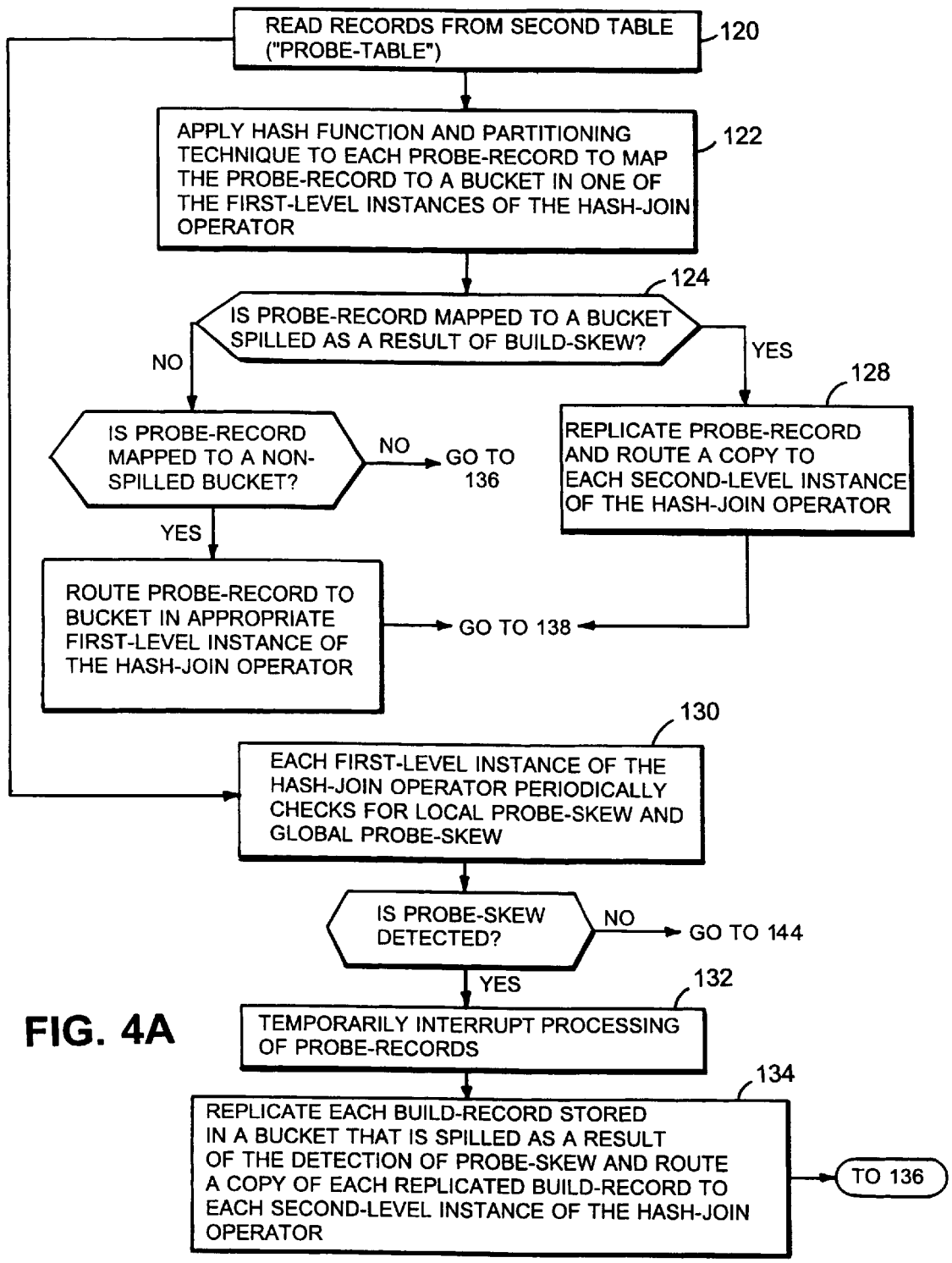
Figure 4B:
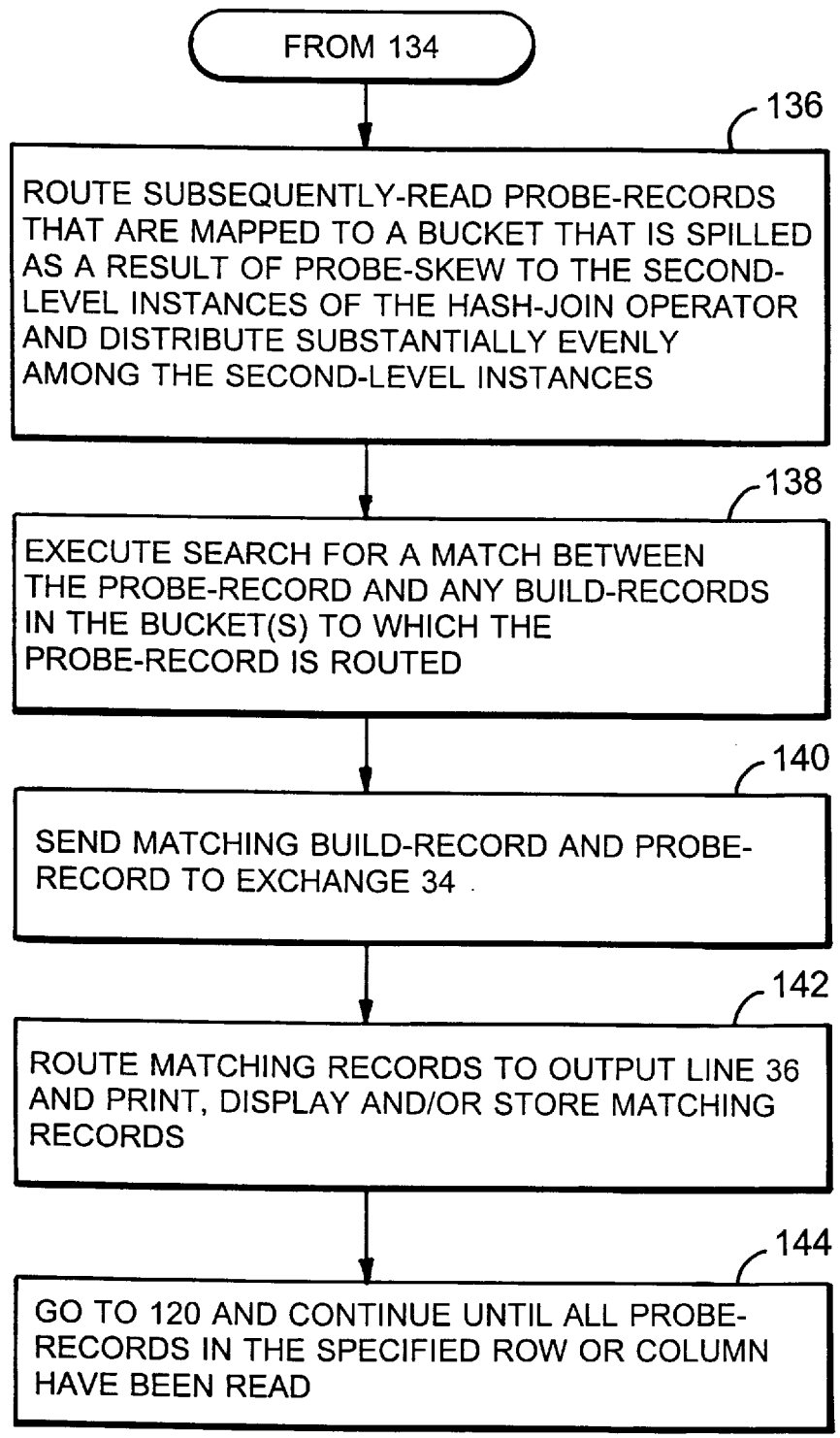

FIGS. 4A and 4B illustrate the processing of records from the second table (the "probe-table") 22. Once all the build-records from the build-table 20 have been routed to the appropriate first or second-level instance of the hash-join operator and stored in the appropriate buckets of the corresponding hash table, the records from a specified row or column of the probe-table 22 are read by the instances of the scan operator 24, as indicated by 120. As further indicated by 122, the same hash function and partitioning techniques as those applied to the build-records are applied to the records read from the probe-table 22. In this manner, each probe-record is mapped to a particular bucket in the hash table in one of the first-level instances of the hash-join operator 28.

As probe-records initially are read from the probe table 22, the corresponding instance of the exchange 26 determines whether each probe-record is mapped to a bucket that was spilled as a result of a prior detection of build-skew (either local or global build-skew), as indicated by 124. If a particular probe-record is mapped to a bucket which has not been spilled, then the probe-record is routed to the bucket in the first-level instance of the hash-join operator 28 to which the probe-record was mapped, as indicated by 126. On the other hand, if a particular probe-record is mapped to a bucket that was spilled due to build-skew, then the probe-record is replicated, and a copy of the replicated probe-record is routed to each of the second-level instances of the hash-join operator, 32(1) through 32(m), as indicated by 128. Sending a copy of the probe-record to each second-level instance of the hash-join operator ensures that if there is a match between the replicated probe-record and a build-record, the match will be found.

The records initially read from the probe-table 22 are routed in the manner described above. As routing of the a probe-records continues, a determination is made periodically as to whether the data from the probe-table 22 is skewed or unevenly distributed, as indicated by 130. Each first-level instance of the hash-join operator, 28(1) through 28(n), checks for two forms of probe-skew, local probe-skew and global probe-skew.

Specifically, each first-level instance of the hash-join operator, 28(1) through 28(n), periodically determines whether any non-spilled bucket in its hash table has received more than a predetermined number or percentage of the probe-records with respect to the other buckets in its hash table. If a particular bucket is receiving more than the predetermined number or percentage of probe-records, then the particular bucket is assumed to be receiving too great a share of the records from the probe-table, and the data in the probe-table is assumed to be unevenly distributed. This form of probe-skew is referred to as local probe-skew. In one implementation, the build-records in the particular bucket receiving too great a share of the probe-records are labelled with a flag indicating that the records mapped to the particular bucket are to be re-routed to the second-level instances of the hash-join operator 32. The detection of this form of probe-skew is made by examining buckets in each instance of the hash-join operator 28 independently of other instances of the hash-join operator. As additional records are read from the probe-table 22, other buckets in the hash table of the same or different instances of the hash-join operator, 28(1) through 28(n), can be found to be receiving too great a share of the records from the probe-table. The build-records in any such additional buckets are also labelled with a flag indicating that the records are to be re-routed to the second-level instances of the hash-join operator 32. Further details are discussed below regarding the detection of this form of probe-skew.

Each first-level instance of the hash-join operator, 28(1) through 28(n), also periodically determines whether it is receiving more than a predetermined number or percentage of the records from the probe-table with respect to the other first-level instances of the hash-join operator. If a particular instance of the hash-join operator 28 is receiving more than the predetermined number or percentage of probe-records, then the particular instance of the hash-join operator is assumed to be receiving too great a share of the records from the probe-table, and the data in the probe-table is assumed to be unevenly distributed. This form of probe-skew is referred to as global probe-skew. The build-records stored in one of the buckets in the particular first-level instance of the hash-join operator 28 that is receiving too great a share of the probe-records are labelled with a flag indicating that the records stored in the particular bucket should be routed to the second-level instances of the hash-join operator 32. The build-records stored in the bucket which currently has the greatest number of probe-records in the particular instance of the hash-join operator that is receiving too great a share of the probe-records are labelled with the flag to indicate that probe-skew has occurred. Further details regarding the detection of global probe-skew and the determination of which bucket has the greatest number of probe-records are discussed below.

When probe-skew is detected, the processing of probe-records is temporarily interrupted, as indicated by 132. As previously noted, each bucket whose records are designated to be re-routed to the second-level instances of the hash-join operator 32 is referred to as a "spilled" bucket. The build-records from a bucket that is spilled due to the detection of probe-skew are sent to the corresponding instance of the exchange, 30(1) through 30(n). The exchange 30 recognizes the flag which is associated with each build-record from the spilled bucket and which indicates that the record was sent from a bucket that was spilled due to probe-skew. The exchange 30 then replicates each such build-record and routes a copy of each replicated build-record to each of the second-level instances of the hash-join operator, 32(1) through 32(m), as indicated by 134. The replicated copies of the build-records are stored in the appropriate buckets of the second-level instances of the hash-join operator 32 based on the hash value corresponding to each such build-record.

As indicated by 136, records that are subsequently read from the probe-table 20 and that have a hash value that corresponds to a bucket that is spilled due to probe-skew (either local or global probe-skew) are also re-routed to the second-level instances of the hash-join operator 32. These subsequently-read probe-records are distributed substantially evenly among the second-level instances of the hash-join operator, for example, using a round-robin technique.

To optimize efficiency, subsequently-read records from the probe-table 22 that are mapped to a bucket which is spilled as a result of the detection of probe-skew can be routed directly to the second-level instances of the hash-join operator 32, thereby bypassing the first-level instance of the hash-join operator 28. As discussed above, control messages can be generated by each first-level instance of the hash-join operator 28 and sent to each instance of the exchange 26. Each such control message includes, for example, an identification of the first-level instance of the hash-join operator, 28(l) through 28(n), that is processing the spilled bucket, an identification of the spilled bucket (for example, by slot and partition), and a flag indicating the type of skew (in this case, probe-skew). This information is maintained in a memory table accessible to each instance of the exchange 26. If, based on the corresponding hash value, a particular probe-record is mapped to a bucket that is labelled as a bucket that was spilled as a result of the detection of probe-skew, then the record is routed by the appropriate instance of the exchange 26 directly to one of the second-level instances of the hash-join operator 32. Probe-records which are routed to the second-level instances of the hash-join operator 32 as a result of the detection of probe-skew are routed in a manner which allows such probe-records to be distributed substantially evenly among the second level of instances of the hash-join operator 32. As indicated above, a round-robin technique is suitable for this purpose.

When, as a result of the prior detection of either build-skew or probe-skew, an instance of the exchange 26 routes a probe-record to the second level of instances of the hash-join operator 32, a flag indicating that the probe-record was mapped to a spilled bucket is also sent. This flag is associated with the single copy of the probe-record in the case of probe-skew and is associated with each replicated copy of the probe-record in the case of build-skew. To minimize the amount of subsequent computation required, the appropriate instance of the exchange 26 can also send the corresponding hash value and the previously computed partition and slot values to the second-level instance(s) of the hash-join operator.

Thus, as indicated by 138, if a probe-record is mapped to a non-spilled bucket, the appropriate first-level instance of the hash-join operator, 28(l) through 28(n), executes the search for a match between the probe-record and any build-records stored in the appropriate bucket. If a probe-record is mapped to a bucket which was spilled as a result of the detection of build-skew, then a replicated copy of the probe-record is routed to each second-level instance of the hash-join operator, 32(l) through 32(m), each of which executes a search for a match between the probe-record and any build-records stored in the appropriate buckets. If a probe-record is mapped to a bucket which was spilled as a result of the detection of probe-skew, then the probe-record is routed, by using a round-robin technique, to one of the second-level instances of the hash-join operator, 32(l) through 32(m), which then executes a search for a match between the probe-record and any build-records stored in the appropriate bucket. As discussed above, this technique ensures that any match between the probe-record and a build-record will be found because the build-records previously stored in the particular spilled bucket were replicated, and a copy of each replicated build-record was routed to each of the second-level instances of the hash-join operator, 32(l) through 32(m).

If a match between a probe-record and a build-record is found by one of the first-level instances of the hash-join operator, 28(l) through 28(n), the matching build-record and probe-record are labelled with a flag indicating that they represent a matching pair of records or tuples. As indicated by 140, the matching records are sent to the corresponding instance of the exchange 30 which recognizes the flag and routes the matching records to the exchange 34. If a match between the probe-record and a build-record is found by one of the second-level instances of the hash-join operator, 32(l) through 32(m), the matching records or tuples are sent to the corresponding instance of the exchange, 34(l) through 34(m). As indicated by 142, the various instances of the exchange 34 route all matching records or tuples to the output line 36 from which the matching records can be printed out on a printer 40, displayed on a display screen 42 or stored in a data file 44 for subsequent retrieval. Alternatively, the matching records can be processed further by a unit 48.

The technique described above can be enhanced to detect another form of global skew, which will be referred to as join-skew. Join-skew is an indication that too great a number or percentage of the matches between build-records and probe-records are being detected and processed by one of the first-level instances of the hash-join operator, 28(l) through 28(n). In other words, join-skew is an indication that the number of matching records is not evenly distributed among the various first-level instances of the hash-join operator. Join-skew can occur even in situations where neither build-skew nor probe-skew is detected.

To detect join-skew, each first-level instance of the hash-join operator, 28(l) through 28(n), determines periodically whether it is finding or producing greater than a predetermined number or-percentage of the total number of matching records found thus far by the first-level instances of the hash-join operator 28. The determination of whether there is join-skew generally takes place concurrently with the processing of the probe-records.

In one implementation, join-skew is handled in the same manner as global probe-skew. Thus, if a particular first-level instance of the hash-join operator, 28(l) through 28(n), detects join-skew, the build-records stored in one of the buckets in the particular first-level instance of the hash-join operator 28 that is finding too great a share of the matching records are labelled with a flag indicating that the records stored in the particular bucket should be routed to the second level of instances of the hash-join operator 32. The build-records labelled with the flag indicating that they were spilled from a bucket as a result of the detection of join-skew are sent to the corresponding instance of the exchange 30 which replicates each build-record and sends a copy of each replicated build-record to each of the second-level instances of the hash-join operator, 32(l) through 32(m). Subsequently-read probe-records that are mapped to a bucket that was spilled as a result of the detection of join-skew are routed to one of the second-level instances of the hash-join operator 32 so as to distribute such probe-records substantially evenly among the second-level instances of the hash-join operator 32. A round-robin technique can be used for this purpose. Other details concerning the handling of join-skew are, in general, substantially the same as the handling of probe-skew.

FIG. 5 summarizes generally the handling of build and probe-records that are mapped to a bucket which is spilled as a result of the detection of one of several forms of skew according to the particular implementation discussed above. However, in other implementations, records that are mapped to a bucket which is spilled as a result of the detection of data skew can be routed to the second-level instances of the hash-join operator 32 in other manners as well.

The detection of local build-skew is now described in greater detail. Each first-level instance of the hash-join operator, 28(1) through 28(n), keeps track of the total number of build-records which it has received from the build-table 20. Each first-level instance of the hash-join operator, 28(1) through 28(n), also keeps track of the number of build-records which are stored in each bucket of its hash table. Moreover, each first-level instance of the hash-join operator 28 can retrieve from memory the total number of buckets in its hash table. Based upon this information, each first-level instance of the hash-join operator, 28(1) through 28(n), continuously determines and keeps track of which bucket in its hash table contains the greatest number of build-records. At any given time prior to the completion of reading the build-records from the table 20, the bucket containing the greatest number of build-records within a particular first-level instance of the hash-join operator, for example, the instance 28(1), is referred to as the "hottest build-stage" bucket in the particular instance of the hash-join operator. Thus, at any given time, each of the first-level instances of the hash-join operator, 28(1) through 28(n), has a hottest build-stage bucket. Each first-level instance, 28(1) through 28(n), can continuously update the information and identify its hottest build-stage bucket. Periodically, each first-level instance of the hash-join operator, 28(1) through 28(n), determines whether the difference between the number of build-records in its hottest build-stage bucket and the average number of build-records stored in each of its buckets exceeds a predetermined threshold. If the threshold is exceeded, then local build-skew is detected, and the hottest build-stage bucket is labelled as a spilled bucket.

The detection of local probe-skew can be performed in a fashion similar to that described above with respect to the detection of local build-skew. Thus, each first-level instance of the hash-join operator, 28(1) through 28(n), keeps track of the total number of probe-records which it has received from the probe-table 20 as well as the number of probe-records which were mapped to each bucket of its hash table. During the processing of the records from the probe-table 22, each first-level instance of the hash-join operator, 28(1) through 28(n), keeps track of the bucket within its hash table to which the greatest number of probe-records have been mapped. At any given time after the reading of the probe-records from the table 22 has begun, the bucket to which the greatest number of probe-records were mapped within a particular first-level instance of the hash-join operator is referred to as the "hottest probe-stage" bucket in the particular instance of the hash-join operator. Thus, at any given time after the reading of the probe-records from the table 22 has begun, each of the first-level instances of the hash-join operator, 28(1) through 28(n), has a hottest probe-stage bucket. Each first-level instance, 28(1) through 28(n), can continuously update the information and identify its hottest probe-stage bucket. Periodically, each first-level instance of the hash-join operator, 28(1) through 28(n), determines whether the difference between the number of probe-records mapped to its hottest probe-stage bucket and the average number of probe-records mapped to each of its buckets exceeds a predetermined threshold. If the threshold is exceeded, then local probe-skew is detected, and the hottest probe-stage bucket is labelled as a spilled bucket.

The detection of global build-skew is now described in greater detail. Each first-level instance of the hash-join operator, 28(1) through 28(n), keeps track of the total number of build-records which it has received from the build-table 20. Each first-level instance of the hash-join operator also can retrieve from memory the number of first-level instances of the hash-join operator being used in the system. Periodically, each first-level instance of the hash-join operator, 28(1) through 28(n) sends a control message to each instance of the exchange 26(1), 26(2) indicating the number of build-records which it has received. Each instance of the exchange 26(1), 26(2) calculates the total number of build-records which have been received by the first-level instances of the hash-join operators 28. When the instances of the exchange 26 route build-records to one of the first-level instances of the hash-join operator 28, the instances of the exchange 26 also provide to the first-level instance of the hash-join operator 28 an indication of the current total number of build-records received by the first-level instances of the hash-join operator 28.

Using the information indicating the current total number of build-records received by the first-level instances of the hash-join operator 28, each first-level instance of the hash-join operator, 28(1) through 28(n), periodically determines whether the difference between the total number of build-records it has received and the average number of build-records sent to each first-level instance, 28(1) through 28(n), exceeds a predetermined threshold. If the threshold is exceeded, then there is global build-skew, and one of the buckets in the particular first-level instance which is receiving too great a share of the build-records is labelled as a spilled bucket. Conveniently, the hottest build-stage bucket can be labelled as the spilled bucket. Global build-skew can occur and can be detected even if local build-skew has not been detected. Conversely, local build-skew can occur and can be detected even if global build-skew has not been detected.

The detection of global probe-skew and join-skew can be made in a manner similar to that described above with respect to the detection of global build-skew. Each first-level instance of the hash-join operator, 28(1) through 28(n), keeps track of the number of probe-records which have been routed to it as well as the number of matching records which it has generated. This information is periodically sent by each first-level instance in a control message to each instance of the exchange 26 which calculate the total number of probe-records routed to the first-level instances 28 and the total number of matching records generated by the first-level instances 28. When the instances of the exchange 26 route probe-records to one of the first-level instances of the hash-join operator 28, the instances of the exchange 26 also provide to the first-level instance of the hash-join operator 28 an indication of the current total number of probe-records received by the first-level instances of the hash-join operator 28. The instances of the exchange 26 also provide the calculated total number of matching records generated by the first-level instances of the hash-join operator 28.

Each first-level instance uses the information returned to it by the corresponding instance of the exchange 26 to determine whether the difference between the number of probe-records it has received and the average number of probe-records routed to each of the first-level instances exceeds a predetermined threshold. If the calculated difference exceeds this threshold, then there is global probe-skew, and one of the buckets in the particular first-level instance which is receiving too great a share of the probe-records is labelled as a spilled bucket. Conveniently, the hottest probe-stage bucket can be labelled as the spilled bucket. Global probe-skew can occur and can be detected even if local probe-skew has not been detected. Conversely, local probe-skew can occur and can be detected even if global probe-skew has not been detected.

Each first-level instance also determines whether the difference between the number of matching records it has produced and the average number of matching records produced by each first-level instance exceeds a predetermined threshold. If the difference exceeds this threshold, then there is join-skew, and one of the buckets in the particular first-level instance which is producing too great a share of the matching records is labelled as a spilled bucket. Again, the hottest probe-stage bucket can be labelled as the spilled bucket.

In an alternative implementation, global build-skew can be detected in the following manner. Periodically, each instance of the exchange 26 sends a control message to each first-level instance of the hash-join operator 28 indicating the total number of build-records that it has forwarded thus far to the first-level instances of the hash-join operator 28. Each first-level instance of the hash-join operator 28 then uses this information as previously described to determine whether global build-skew has occurred. This implementation can be particularly advantageous if control messages are to be sent during the build-stage to the first-level instances of the hash-join operator 28 separately from data corresponding to the build-records. This may be desirable, for example, in situations where relatively little data corresponding to build-records is being routed to a particular first-level instance of the hash-join operator 28.

The frequency with which each first-level instance, 28(1) through 28(n), checks for the various forms of data skew can depend upon the rate at which build-records or probe-records are being received by the particular first-level instance of the hash-join operator. Thus, for example, a particular first-level instance of the hash-join operator 28 checks for build-skew (local and global) each time it receives an additional one-hundred thousand build-records. Similarly, a particular first-level instance of the hash-join operator 28 checks for probe-skew (local and global) each time it receives an additional one-hundred thousand probe-records. The frequency with which each first-level instance of the hash-join operator, 28(1) through 28(n), checks for join-skew is half-the frequency with which it checks for probe-skew. Thus, for example, a particular first-level instance of the hash-join operator 28 checks for join-skew each time it receives an additional two-hundred thousand probe-records.

The various first-level instances of the hash-join operator, 28(1) through 28(n), may actually check for a particular form of data skew at different times depending upon the actual rate at which each first-level instance of the hash-join operator is receiving build-records or probe-records. Moreover, the frequency with which control messages are generated and sent between the instances of the exchange 26 and the first-level instances of the hash-join operator 28 should be sufficiently high so that the first-level instances of the hash-join operator 28 have substantially current information when they check for global skew.

When each instance of the exchange 26 has completed routing all the build-records being processed by it, the instance of the exchange 26 sends a control message to each first-level instance of the hash-join operator 28 to signal that the instance of the exchange 26 has completed the build-stage. It is possible that, if a particular first-level instance of the hash-join operator 28 is receiving relatively few build-records, the reading and initial routing of all the build-records from the build-table will be completed prior to the particular instance of the hash-join operator 28 checking for local or global build-skew. Should this situation occur, the particular first-level instance of the hash-join operator automatically checks for local and global build-skew prior to the beginning of the probe-stage. This technique ensures that each first-level instance of the hash-join operator 28 checks for local and global build-skew at least once prior to scanning the probe-records from the probe-table.

The thresholds used during the detection of the various forms of data skew can be based on the number of first-level instances of the hash-join operator 28. In general, the greater the number of first-level instances of the hash-join operator 28, the lower the threshold will be. Conversely, the lower the number of first-level instances of the hash-join operator, the higher the threshold will be. These thresholds can be preset in memory. Frequencies and thresholds different from-those discussed above can be used. Moreover, the frequencies for local and global skew, as well as for build and probe-skew, can be different from one another. More generally, the detection of the various forms of data skew can be implemented in any number of ways.

The system shown in FIG. 2 also includes a memory manager 38. When a query is received by the system, the memory manager 38 allocates available memory to handle and process the new query. Specifically, the memory manager 38 allocates a certain amount of memory to the first and second-level instances of the hash-join operator 28 and 32 to perform the hash-join operation. The first and second-level instances of the hash-join operator 28, 32 share this allocated memory.

In one implementation, for example, the memory manager 38 initially allocates a percentage of the available memory to the first-level instances of the hash-join operator, 28 (1) through 28 (n). If a bucket in one of the first-level instances of the hash-join operator is spilled as a result of the detection of build-skew, then the memory previously used in connection with the spilled bucket is released for use by one or more of the instances of the hash-join operator, 28(1) through 28(n) and 32(1) through 32 (m). For example, the released memory can be re-allocated by the memory manager 38 to one of the second-level instances of the hash-join operator. Additionally, in anticipation of the need for memory to be allocated to the second-level instances of the hash-join operator 32 when probe-skew or join-skew is detected, the memory manager 38 can reserve a certain percentage of the available memory and distribute the reserved memory to the second-level instances of the hash-join operator when needed.

Other implementations are contemplated within the scope of the following claims.

What is claimed is:

1. A computer-based method of processing records read respectively from first and second related tables of a database comprising:

determining whether data contained in the records read from at least one of the first and second tables is unevenly distributed; and searching for matches among records corresponding to evenly distributed data using a first set of instances of the hash-join operator, and searching for matches among records corresponding to data which is unevenly distributed using a second set of instances of a hash-join operator.

2. The method of claim 1 wherein determining comprises checking whether one of the instances in the first set of instances of the hash-join operator is receiving a relatively uneven number of the records read from the first table.

3. The method of claim 2 wherein the determining is done periodically.

4. The method of claim 1 wherein each instance in the first set and second set of instances of the hard-join operator comprises a respective hash table comprising a plurality of buckets, the method further comprising labelling one of the buckets in a particular instance in the first set of instances of the hash-join operator as a spilled bucket if it is determined that the particular instance of the hash-join operator is receiving a relatively uneven number of the records read from the first table, wherein records that are read from the first table and that are mapped to the spilled bucket are routed to at least one of the second set of instances of the hash-join operator.

5. The method of claim 4 wherein records that are read from the second table and that are mapped to the spilled bucket are routed to at least one instance in the second set of instances of the hash-join operator.

6. The method of claim 5 wherein records that are read from the second table and that are mapped to the spilled bucket are replicated and a copy of each such replicated record is routed to each of the second set of instances of the hash-join operator.

7. The method of claim 4 wherein records that are read from the first table and that are mapped to the spilled bucket are routed to and distributed substantially evenly among the second set of instances of the hash-join operator.

8. The method of claim 7 wherein records that are read from the first table and that are mapped to the spilled bucket are routed to and distributed substantially evenly among the second set of instances of the hash-join operator using a round-robin technique.

9. The method of claim 1 wherein each instance of the first set and second set of instances of the hash-join operator comprises a respective hash table comprising a plurality of buckets, wherein the determining comprises checking whether one of the buckets in a particular instance from the first set of instances of the hash-join operator is receiving a relatively uneven number of the records read from the first table relative to other buckets in the particular instance of the hash-join operator.

10. The method of claim 9 further comprising labelling a particular bucket in one of the first set of instances of the hash-join operator as a spilled bucket if it is determined that the particular bucket is receiving a relatively uneven number of the records read from the first table.

11. The method of claim 10 wherein records that are read from the first table and that are mapped or routed to the spilled bucket are routed to at least one of the second set of instances of the hash-join operator.

12. The method of claim 10 wherein records that are read from the second table and that are mapped to the spilled bucket are routed to at least one of the second set of instances of the hash-join operator.

13. The method of claim 10 wherein records that are read from the first table and that are mapped to the spilled bucket are routed to and distributed substantially evenly among the second set of instances of the hash-join operator.

14. The method of claim 13 wherein records that are read from the first table and that are mapped to the spilled bucket are routed to and distributed substantially evenly among the second set of instances of the hash-join operator using a round-robin technique.

15. The method of claim 10 wherein records that are read from the second table and that are mapped to the spilled bucket are replicated and a copy of each such replicated record is routed to each of the second set of instances of the hash-join operator.

16. The method of claim 9 wherein the determining is done periodically.

17. The method of claim 1 wherein determining comprises checking whether one of the first set of instances of the hash-join operator is receiving relatively uneven number of the records read from the second table.

18. The method of claim 17 wherein each instance in the first set and second set of instances of the hash-join operator comprises a respective hash table comprising a plurality of buckets, the method further comprising labelling one of the buckets in a particular instance of the first set of instances of the hash-join operator as a spilled bucket if it is determined that the particular instance of the hash-join operator is receiving a relatively uneven number of records read from the second table, wherein records that were previously read from the first table and routed to the spilled bucket are routed to at least one of the second set of instances of the hash-join operator, and wherein records that are read from the second table and mapped to the spilled bucket are routed to at least one of the second set of instances of the hash-join operator.

19. The method of claim 18 wherein records that were previously read from the first table and routed to the spilled bucket are replicated and a copy of each such replicated record is routed to each instance in the second set of instances of the hash-join operator.

20. The method of claim 18 wherein records that are read from the second table and that are mapped to the spilled bucket are routed to and distributed substantially evenly among the second set of instances of the hash-join operator.

21. The method of claim 19 wherein records that are read from the second table and that are mapped to the spilled bucket are routed to and distributed substantially evenly among the second set of instances of the hash-join operator using a round-robin technique.

22. The method of claim 17 wherein the determining is done periodically.

23. The method of claim 1 wherein each instance of the first set and second set of instances of the hash-join operator comprises a respective hash table comprising a plurality of buckets, wherein determining comprises checking whether any of the buckets in a particular instance of the first set of instances of the hash-join operator is receiving a relatively uneven number of the records read from the second table relative to other buckets in the particular instance of the hash-join operator.

24. The method of claim 23 further comprising:
labelling a particular bucket in one of the firs set of instances of the hash-join operator as a spilled bucket if it is determined that the particular bucket is receiving a relatively uneven number of the records read from the second table; and
routing records that were previously read from the first table and routed to the spilled bucket to at least one of the second set of instances of the hash-join operator.

25. The method of claim 24 wherein records that are read from the second table and that are mapped or routed to the spilled bucket are routed to at least one of the second set of instances of the hash-join operator.

26. The method of claim 24 wherein records that were previously read from the first table and routed to the spilled bucket are replicated, and a copy of each such replicated record is routed to each instance in the second set of instances of the hash-join operator.

27. The method of claim 24 wherein records that are read from the second table and mapped to the spilled bucket are routed to and distributed substantially evenly among the second set of instances of the hash-join operator.

28. The method of claim 27 wherein records that are read from the second table and that are mapped to the spilled bucket are routed to and distributed substantially evenly among the second set of instances of the hash-join operator using a round-robin technique.

29. The method of claim 1 further comprising allocating memory to be shared among the first set and second set of instances of the hash-join operator.

30. The method of claim 29 further comprising releasing memory previously allocated to one of the instances in the first set of instances of the hash-join operator to be used by at least one of the instances in the second set of instances of the hash-join operator.

31. The method of claim 1 herein each instance in the first set of instances checks at least once whether the data contained in the records read from the first table is unevenly distributed.

32. The method of claim 1 wherein determining comprises checking whether data contained in the records read from both the first and second tables is unevenly distributed.

33. The method of claim 32 wherein the determining is done periodically.

34. A computer-based method of processing records read respectively from first and second related tables of a database comprising:

searching for matching records among the records read from the first and second tables using a first set of instances of a hash-join operator, wherein each instance of the first set of instances of the hash-join operator comprises a respective hash table comprising a plurality of buckets;

determining whether one of the instances in the first set of instances of the hash-join operator is producing a relatively uneven number of matching records;

labelling one of the buckets in a particular instance in the first set of instances of the hash-join operator as a spilled bucket if it is determined that the particular instance of the hash-join operator is producing a relatively uneven number of the matching records; and continuing to search for matches among records mapped to a non-spilled bucket using the first set of instances of the hash-join operator, and searching for matches among records mapped to the spilled bucket using a second set of instances of a hash-join operator.

35. The method of claim 34 wherein records that were previously read from the first table and routed to the spilled bucket are replicated, and a copy of each such replicated record is routed to each instance in the second set of instances of the hash-join operator.

36. The method of claim 34 wherein records that are read from the second table and that are mapped to the spilled bucket are routed to and distributed substantially evenly among the second set of instances of the hash-join operator.

37. The method of claim 36 wherein records that are read from the second table and that are mapped to the spilled bucket are routed to and distributed substantially evenly among the second set of instances of the hash-join operator using a round-robin technique.

38. A programmable computer system comprising at least one processor, a data storage system, at least one input device, and at least one output device, wherein the data storage system includes a database including a first table and a second table related to the first table, wherein the at least one processor is programmed to respond to a query received through the input device by performing operations including:

reading records from the first table;

reading records from the second table;

determining whether data contained in the records read from at least one of the first and second tables is unevenly distributed; and searching for matches among records corresponding to evenly distributed data using a first set of instances of the hash-join operator, and searching for matches among records corresponding to data which is unevenly distributed using a second set of instances of a hash-join operator.

39. A programmable computer system comprising at least one processor, a data storage system, at least one input device, and at least one output device, wherein the data storage system includes a database including a first table and a second table related to the first table, wherein the at least one processor is programmed to respond to a query received through the input device by performing operations including:

reading records from the first table;

reading records from the second table;

searching for matching records among the records read from the first and second tables using a first set of instances of a hash-join operator, wherein each instance of the first set of instances of the hash-join operator comprises a respective hash table comprising a plurality of buckets;

determining whether one of the instances in the first set of instances of the hash-join operator is producing a relatively uneven number of matching records;

labelling one of the buckets in a particular instance in the first set of instances of the hash-join operator as a spilled bucket if it is determined that the particular instance of the hash-join operator is producing a relatively uneven number of the matching records; and continuing to search for matches among records mapped to a non-spilled bucket using the first set of instances of the hash-join operator, and searching for matches among records mapped to the spilled bucket using a second set of instances of a hash-join operator.

40. A computer program, residing on a computer-readable medium, comprising instructions for causing a computer system to:

read records from a first table in a database;

read records from a second table in the database, wherein the first and second table are related;

determine whether data contained in the records read from at least one of the first and second tables is unevenly distributed; and search for matches among records corresponding to evenly distributed data using a first set of instances of the hash-join operator, and search for matches among records corresponding to data which is unevenly distributed using a second set of instances of a hash-join operator.

41. A computer program, residing on a computer-readable medium, comprising instructions for causing a computer system to:

read records from a first table in a database;

read records from a second table in the database, wherein the first and second table are related;

search for matching records among the records read from the first and second tables using a first set of instances of a hash-join operator, wherein each instance of the first set of instances of the hash-join operator comprises a respective hash table comprising a plurality of buckets;

determine whether one of the instances in the first set of instances of the hash-join operator is producing a relatively uneven number of matching records;

label one of the buckets in a particular instance in the first set of instances of the hash-join operator as a spilled bucket if it is determined that the particular instance of the hash-join operator is producing a relatively uneven number of the matching records; and continue to search for matches among records mapped to a non-spilled bucket using the first set of instances of the hash-join operator, and search for matches among records mapped to the spilled bucket using a second set of instances of a hash-join operator.

* * * * *

UNITED STATES PATENT AND TRADEMARK OFFICE
CERTIFICATE OF CORRECTION

PATENT NO.       : 5,873,074

DATED            : February 16, 1999

INVENTOR(S)      : Kashyap et al.

It is certified that error appears in the above-identified patent and that said Letters Patent is hereby corrected as shown below:

Claim 4, Column 16, Line 67, change "hard" to --hash--;
Claim 24, Column 18, line 42, change "firs" to --first--.

Signed and Sealed this

Twentieth Day of July, 1999

Attest:

Attesting Officer

Q. TODD DICKINSON

Acting Commissioner of Patents and Trademarks